(12) United States Patent
Atsuta (10) Patent No.: US 6,813,239 B2
(45) Date of Patent: Nov. 2, 2004

(54) DUAL TRANSMISSION SPREAD PROCESSING CIRCUIT SYSTEM FOR CDMA COMMUNICATION APPARATUS

(75) Inventor: Hirosada Atsuta, Tokyo (JP)

(73) Assignee: NEC Corporation, Tokyo (JP)

( * ) Notice: Subject to any disclaimer, the term of this patent is extended or adjusted under 35 U.S.C. 154(b) by 797 days.

(21) Appl. No.: 09/757,369

(22) Filed: Jan. 9, 2001

(65) Prior Publication Data

US 2001/0008518 A1 Jul. 19, 2001

(30) Foreign Application Priority Data

Jan. 13, 2000 (JP) ........................................ 2000-004951

(51) Int. Cl.[7] ................................................. H04J 1/16
(52) U.S. Cl. ........................ 370/217; 370/335; 370/535; 455/561
(58) Field of Search ................................ 370/217–228, 370/241–248, 335, 342, 441, 535; 455/561, 423

(56) References Cited

U.S. PATENT DOCUMENTS 5,835,696 A 11/1998 Hess
6,188,912 B1 * 2/2001 Struhsaker et al. ......... 455/561

FOREIGN PATENT DOCUMENTS

GB 2 188 177 A 9/1987

OTHER PUBLICATIONS

Abstract of Japanese Application No. 10271042.

Abstract of EP 01 10 0120.3.

* cited by examiner

Primary Examiner—John Pezzlo
(74) Attorney, Agent, or Firm—Dickstein, Shapiro, Morin & Oshinsky, LLP.

(57) ABSTRACT

A CDMA communication apparatus includes a system of dual transmission spread processing circuits wherein switching control of one of the transmission spread processing circuits from an operating system to a standby system is performed momentarily by software while miniaturization and reduction in cost of the apparatus are assured. A spread processing circuit of each of dual transmission spread processing circuits is divided into two sections of an operating system spread processing section and a standby system spread processing section. Spread signals processed by the operating system spread processing section and the standby system spread processing section are addition synthesized by a first addition synthesis section and a second addition synthesis section separately from each other. An addition selection section for selecting whether or not operating system spread signals and standby system spread signals should be addition synthesized is provided in each of the transmission spread processing circuits. The addition selection section is directly controlled with a failure detection signal from a failure detection section of the other one of the dual transmission spread processing circuits.

10 Claims, 9 Drawing Sheets

DUAL TRANSMISSION SPREAD PROCESSING CIRCUIT SYSTEM FOR CDMA COMMUNICATION APPARATUS

BACKGROUND OF THE INVENTION

1. Field of the Invention

The present invention relates to a radio base station communications apparatus for mobile communication wherein an information signal on which signals spread with codes orthogonal to each other are code division multiplexed is communicated between a base station and a child station by a code division multi access (Code Division Multi Access, CDMA) system which uses a spread spectrum technique for radio transmission, and particularly to a dual transmission spread processing circuit system for a radio base station communications apparatus.

2. Description of the Related Art

A basic construction of a dual system for a conventional transmission spread processing section of a communication base station apparatus of the CDMA system as described above is shown in FIG. 8.

Figure 8:
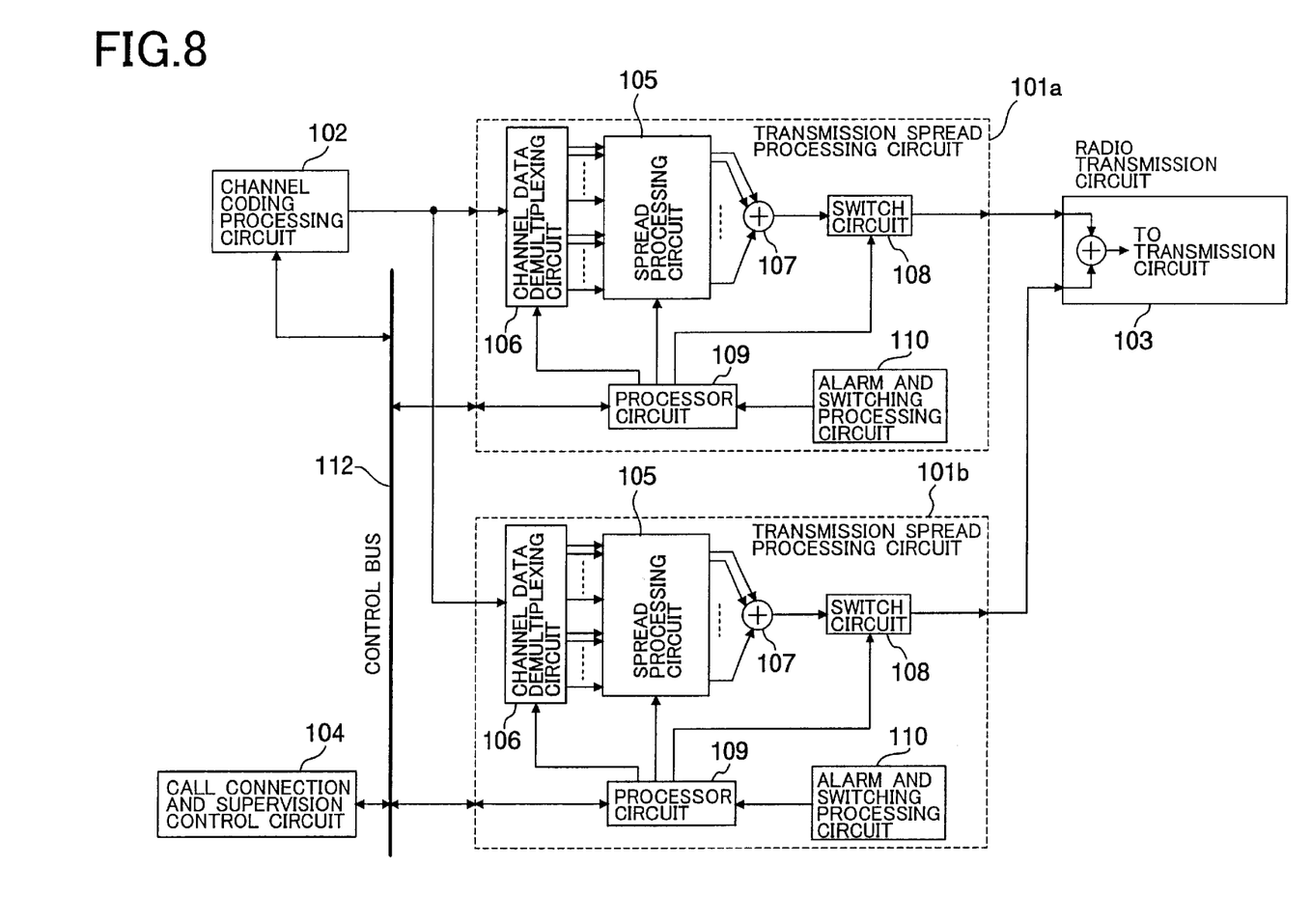
FIG. 8 is a block diagram showing a basic construction of a conventional dual transmission spread processing circuit system for a radio base station communications apparatus.

Referring to FIG. 8, in the conventional transmission spread processing section shown, two first and second transmission spread processing circuits 101a and 101b form a dual configuration and are individually connected in parallel to a channel coding processing circuit 102, a radio transmission circuit 103 and a call connection and supervision control circuit 104.

A transmission baseband signal before spread from the channel coding processing circuit 102 is inputted to the two transmission spread processing circuits 101a and 101b, in each of which it is spread modulated and addition synthesized by a spread processing circuit 105. Then, synthesis spread signals from the spread processing circuits 105 are sent to the radio transmission circuit 103. In the inside of the radio transmission circuit 103, the synthesis spread signals from the two transmission spread processing circuits 101a and 101b are added to each other by an inputting section of the radio transmission circuit 103. Then, the addition synthesis signal is inputted to a transmission circuit which performs quadrature amplitude modulation and radio frequency amplification.

The channel coding processing circuit 102 and the two transmission spread processing circuits 101a and 101b are connected to the call connection and supervision control circuit 104 by a control bus 112 so that coding processing information, spread processing information, signaling control information and so forth are communicated between them.

Subsequently, details of the internal configuration of each of the transmission spread processing circuits 101a and 101b are described.

A transmission baseband signal on which data of a plurality of channels are time division multiplexed is inputted from the channel coding processing circuit 102 to the transmission spread processing circuits 101a and 101b. In each of the transmission spread processing circuits 101a and 101b, data of the individual channels are demultiplexed from the transmission baseband signal and converted into user data having data rates defined for individual users by the channel data demultiplexing circuit 106. The spread processing circuit 105 receives the plurality of user data having the different data rates, performs spread modulation for transmission for the user data and outputs spread signals for the individual users.

An addition synthesizer 107 adds all of the spread signals for the different users to obtain a synthesis spread signal and outputs the synthesis spread signal to the radio transmission circuit 103 through a switch circuit 108. The channel data demultiplexing circuit 106, spread processing circuit 105 and switch circuit 108 are all controlled by software of a processor circuit 109. The processor circuit 109 is connected to the call connection and supervision control circuit 104 over the control bus 112 outside the transmission spread processing circuit 101a (101b) so that it may principally communicate spread process information and signaling control information with the call connection and supervision control circuit 104. Further, the processor circuit 109 receives alarm-switching information from an alarm and switching processing circuit 110 and signals it to the call connection and supervision control circuit 104 over the control bus 112.

Such a conventional dual configuration of transmission spread processing circuits as described above must have a function that, if a failure occurs with either one of the two dual transmission spread processing circuits 101a and 101b, then processing which has been performed by the transmission spread processing circuit with which the failure has occurred is compensated for by the other normal transmission spread processing circuit.

In a normal state in which none of the two transmission spread processing circuits suffers from a failure, only one of the dual transmission spread processing circuits performs processing of the dual portions of the apparatus. Thus, an element or elements of dual components which are operating are hereinafter referred to as operating system. In this instance, the operating system assumes transmission spread processing while the is in a standby state and systematically does not contribute to the transmission spread processing in the normal state. Thus, an element or elements of dual components which stand by are hereinafter referred to as standby system. In this instance, when a failure occurs with the operating system, switching to the standby system is performed. An apparatus or system of the type described is generally called set standby switching system or hot standby system.

Applying this to FIG. 8, it is assumed that the first transmission spread processing circuit 101a is the operating system and the second transmission spread processing circuit 101b is the standby system. In the normal state, all transmission spread processing as the transmission spread processing section is performed by the transmission spread processing circuit 101a of the operating system, and the transmission spread processing circuit 101b of the standby system is in a standby state and does not at all share transmission spread processing required for the apparatus then.

If a failure occurs with the transmission spread processing circuit 101a of the operating system, then this is first detected by the alarm and switching processing circuit 110 in the transmission spread processing circuit 101a, and the detection information is sent to the processor circuit 109. From the processor circuit 109, the detection information is transmitted to the call connection and supervision control circuit 104 over the control bus 112 outside the transmission spread processing circuit 101a. The call connection and supervision control circuit 104 receives the failure detection information and performs switching control to the standby system.

Here, as operation of the transmission spread processing circuit 101b of the standby system in its standby state, it is desirable from the point of view of minimization of the time of the switching process that it executes processing quite same as the transmission spread processing of the operating system but only its transmission output is stopped at the switch circuit 108 of the standby system. The switching process performed by the call connection and supervision control circuit 104 where the standby system operates in this manner is to control the switch circuit 108 in the failed transmission spread processing circuit 101a of the operating system so that the transmission output of the transmission spread processing circuit 101a is stopped and simultaneously control the switch circuit 108 of the standby system so that transmission may be performed from the transmission spread processing circuit 101b of the standby system.

Since the conventional system having such a configuration as described above performs output switching from the operating system to the standby system by hardware, restoration upon failure can be performed momentarily. However, since such a hardware configuration that the transmission spread processing circuit of the standby system must stand by while performing the quite same process as that of the transmission spread processing circuit of the operating system must be employed, as the number (unit number) of channel coding processing circuits increases in accordance with an increase of the number of channels, the number of input signal lines to the channel data demultiplexing circuit 106 of each of the transmission spread processing circuits increases. This complicates the circuit configuration of the channel data demultiplexing circuit 106 and gives rise to an increase in scale and an increase in production cost.

Figure 9:
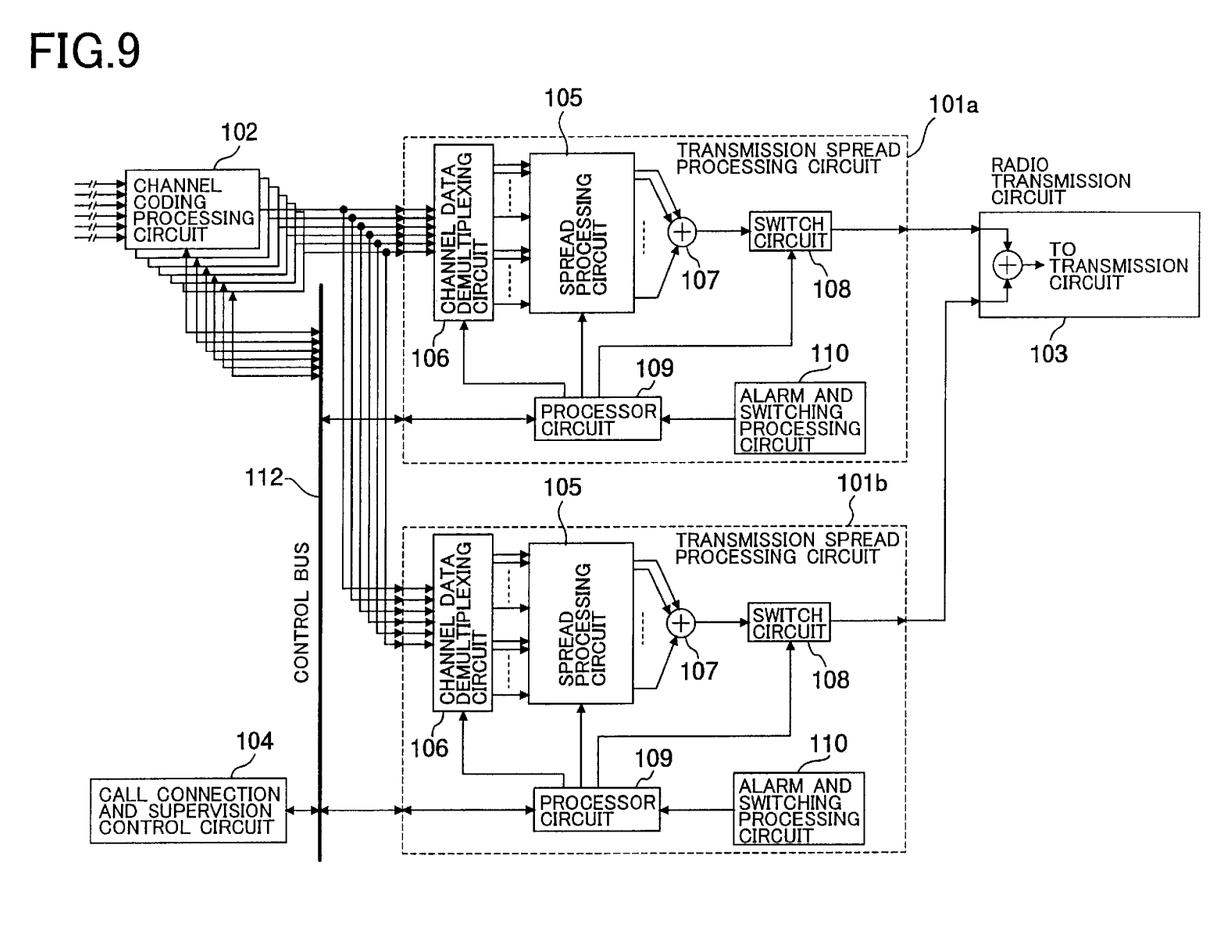
FIG. 9 is a block diagram showing a modified form of the conventional dual transmission spread processing circuit system for a radio base station communications apparatus of FIG. 8 wherein it is connected to a plurality of channel coding processing circuits.

This is described more specifically with reference to FIG. 9 which shows a transmission spread processing section including six channel coding processing circuits 102. Referring to FIG. 9, the channel coding processing circuits 102 are mounted separately from one another on separate printed circuit boards such that they form separate units each in the form of a panel. Each unit receives and multiplexes a plurality of input signals and outputs a single transmission baseband signal to the transmission spread processing circuits 101a and 101b. In this instance, the bit rate and so forth of the input signals are controlled through the control bus 112.

Accordingly, the number of input signal lines inputted to the channel data demultiplexing circuit 106 of each of the transmission spread processing circuits 101a and 101b is 6, and as the number of such input signal lines increases, the circuit configuration of the signal inputting section of the channel data demultiplexing circuit 106 is complicated and increases in scale.

SUMMARY OF THE INVENTION

It is an object of the present invention to provide a dual transmission spread processing circuit system for a radio base station communications apparatus which is simplified in circuit configuration and can be produced in a reduced size and at a reduced.

It is another object of the present invention to provide a dual transmission spread processing circuit system for a radio base station communications apparatus by which switching after occurrence of a failure till restoration can be performed momentarily.

It is to be noted that the term "failure" in the present specification is used to signify a broad concept including any fault or abnormal state in which an apparatus does not operate normally.

In order to attain the objects described above, according to an aspect of the present invention, there is provided a dual transmission spread processing circuit system for a CDMA communication apparatus, comprising dual transmission spread processing circuits each including a spread processing section for spread modulating transmission data of a plurality of channels, an addition synthesis section for addition synthesizing a plurality of spread signals processed by the spread processing section, an output selection section for selecting whether or not a synthetic spread signal of the addition synthetic section should be outputted, a failure detection section for detecting a failure, and a control section, the spread processing section of each of the transmission spread processing circuits including two sections of an operating system spread processing section and a standby system spread processing section, the addition synthesis section addition synthesizing spread signals processed by the operating and standby system spread processing sections separately from each other, each of the transmission spread processing circuits including an addition selection section for selecting whether or not the operating system spread signal and the standby system spread signal should be addition synthesized, the addition selection section being controlled with a failure detection signal from the failure detection section of the other one of the dual transmission spread processing circuits.

Each of the transmission spread processing circuits may include a control selection section for selecting whether the addition selection section should be controlled immediately or through the control section when a failure detection signal is received from the failure detection section of the other one of the transmission spread processing circuits. When the addition selection section should be controlled through the control section, the addition selection section may be changed over to the addition side at a designated timing in a radio frame. This allows arbitrary selection between a momentary switching operation and a synchronous switching operation wherein switching is performed at a designated timing of a radio frame.

The output selection section may be controlled by that one of the control sections which receives the failure detection signal from the failure detection section.

The addition synthesis section of each of the transmission spread processing circuits may include a first addition synthesis section for adding a plurality of spread signals processed by the operating system spread processing section, a second addition synthesis section for adding a plurality of spread signals processed by the standby system spread processing section, and a third addition synthesis section for addition synthesizing synthetic spread signals of the first and second addition synthesis sections.

Each of the failure detection sections may detect a failure of the control section as well. This promotes the effects of the dual system.

Each of the transmission spread processing circuits may include a channel data demultiplexing section for receiving a transmission baseband signal on which data of a plurality of channels are time division multiplexed from a channel coding processing circuit, demultiplexing the transmission baseband signal into data of the individual channels and converting the data of the individual channels into data corresponding to data rates for individual users, and outputs of the channel data demultiplexing section may be inputted to both of the operating system spread processing section and the standby system spread processing section. Where a plurality of channel coding circuits are provided and grouped corresponding to the dual transmission spread processing circuits, the channel data demultiplexing section of each of the transmission spread processing circuits may receive transmission baseband signals from the channel coding processing circuits of the corresponding group. The control section may receive the failure detection signal from the fault detection section of the other one of the dual transmission spread processing circuits and controls the channel coding processing circuits over a control bus.

In the dual transmission spread processing circuit system for a CDMA communication apparatus described above, the spread transmission circuit in each of the transmission spread processing circuits is divided into an operating system spread processing section and a standby system processing section, and normally. Spread signals from the operating system spread transmission circuits of both of the spread processing circuits are extracted while each of the standby system spread processing circuits of the spread processing circuits performs the same processing as that of the operating system of the other side spread processing circuit but outputting from the standby system spread processing circuit is stopped. Then, when a failure occurs, the normal side system is controlled directly with failure detection information from the failed side transmission spread processing circuit to switch so that spread signals are extracted from the operating system spread processing section and the standby system spread processing section of the spread processing circuit of the normal side. Accordingly, since a spread signal output allocated as the standby system can be controlled so as to be signaled momentarily by hardware by each of the transmission spread processing circuits, switching after occurrence of a failure till recovery can be performed momentarily by hardware means, and miniaturization and reduction of the cost of the apparatus are achieved.

According to another aspect of the present invention, a dual transmission spread processing circuit system for a CDMA communication apparatus is constructed such that the two dual transmission spread processing circuits are both used in a normal state, but if a failure occurs with one of them, then the normal one of them performs all of the processing which has been performed by the two transmission spread processing circuits. In this instance, also during failure of one of the transmission spread processing circuits, all of the transmission spread processing must naturally be performed by an amount and at a rate equal to those before the failure occurs. Thus, the sum total of the transmission spread processing amounts processed by the two transmission spread processing circuits must always be suppressed equal to or lower than the transmission spread processing capacity of each of the transmission spread processing circuits.

Thus, according to the second aspect of the present invention, there is provided a dual transmission spread processing circuit system for a CDMA communication apparatus, comprising dual transmission spread processing circuits each including a channel data demultiplexing section for receiving a transmission baseband signal on which data of a plurality of channels are time division multiplexed from a channel coding processing circuit, demultiplexing the transmission baseband signal into data of the individual channels and converting the data of the individual channels into data corresponding to data rates for individual users, a spread processing section for spread modulating the transmission data of the plurality of channels processed by the channel data demultiplexing section, an addition synthesis section for addition synthesizing a plurality of spread signals processed by the spread processing section, an output selection section for selecting whether or not a synthetic spread signal of the addition synthetic section should be outputted, a failure detection section for detecting a failure, and a control section, a plurality of channel coding processing circuits being provided and grouped corresponding to the dual transmission spread processing circuits, the channel data demultiplexing section of each of the transmission spread processing circuits receiving transmission baseband signals from the channel coding processing circuits of the corresponding group, the channel coding processing circuits of the two groups being connected to each other by bypass routes, the channel coding processing circuits of each of the groups being connected to the control section and a call connection and supervision section over a control bus, and the call connection and supervision section controlling, when the failure detection section of one of the transmission spread processing circuits with which a failure has occurred detects the failure and issues a notification of the failure to the call connection and supervision section over the control bus, the channel coding processing circuits of the two groups so that processing by the plurality of channel coding processing circuits of the failed side group is transferred to the plurality of channel coding processing circuits of the normal side group.

In the dual transmission spread processing circuit system for a CDMA communication apparatus, the plurality of channel coding processing circuits are divided into groups corresponding to the dual transmission spread processing circuits, and the two groups of channel coding processing circuits are connected to each other by the bypassing routes. If some failure occurs, then processing by the plurality of channel coding processing circuits of the abnormal side group is transferred to the plurality of channel coding processing circuits of the normal side group. Consequently, although the switching time after occurrence of a fault till restoration is longer than that by the dual transmission spread processing circuit system for a CDMA communication apparatus according to the first aspect of the present invention described above, miniaturization and reduction in cost of the apparatus can be achieved.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
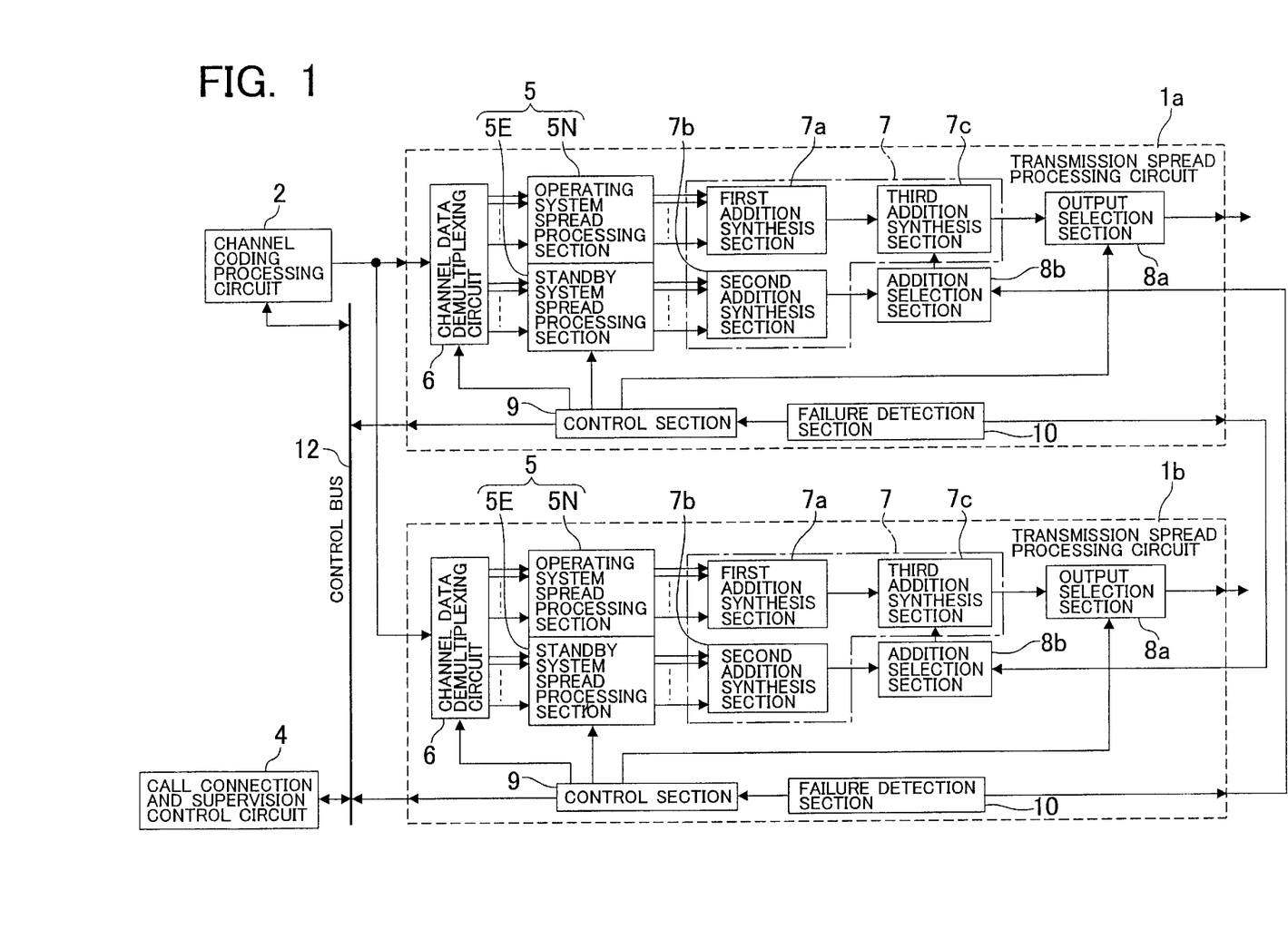
FIG. 1 is a block diagram showing a basic configuration of a dual transmission spread processing circuit system for a radio base station communications apparatus according to the present invention.

Before preferred embodiments of the present invention are described, a basic concept of the present invention is described first. Referring to FIG. 1, there is shown a dual transmission spread processing circuit system for a CDMA communication apparatus according to a basic concept of the present invention. The dual transmission spread processing circuit system for a CDMA communication apparatus includes dual transmission spread processing circuits 1a and 1b each including a spread processing section 5 for spread modulating transmission data of a plurality of channels, an addition synthesis section 7 for addition synthesizing a plurality of spread signals processed by the spread processing section 5, an output selection section 8a for selecting whether or not a synthetic spread signal of the addition synthetic section 7 should be outputted, a failure detection section 10 for detecting a failure, and a control section 9. The spread processing section 5 of each of the transmission spread processing circuits 1a and 1b is divided into two sections of an operating system spread processing section 5N and a standby system spread processing section 5E, and spread signals processed by the operating and standby system spread processing sections 5N, 5E are addition synthesized separately from each other by the addition synthesis section 7. Each of the transmission spread processing circuits 1a and 1b includes an addition selection section 8b for selecting whether or not the operating system spread signal and the standby system spread signal should be addition synthesized. Further, the addition selection section 8b is controlled with a failure detection signal from the failure detection section 10 of the other one of the dual transmission spread processing circuits 1a and 1b.

Figure 2:
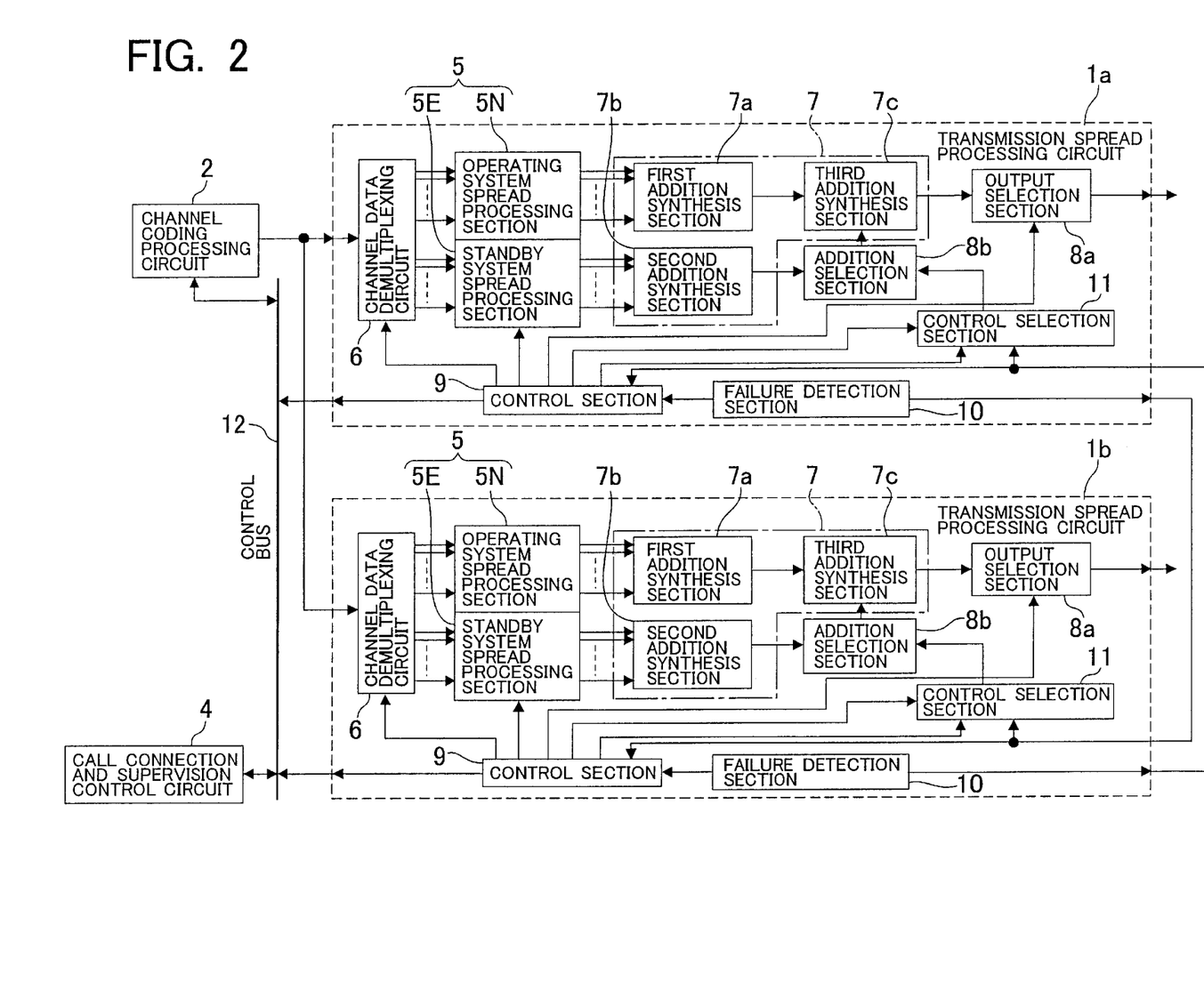
FIG. 2 is a block diagram showing another configuration of a dual transmission spread processing circuit system for a radio base station communications apparatus according to the present invention.

Each of the transmission spread processing circuits 1a and 1b may include, as shown in FIG. 2, a control selection section 11 for selecting whether the addition selection section 8b should be controlled immediately or through the control section 9 when a failure detection signal is received from the failure detection section 10 of the other one of the transmission spread processing circuits 1a and 1b. When the addition selection section 8b should be controlled through the control section 9, the addition selection section 8b is changed over to the addition side at a designated timing in a radio frame such that a momentary switching operation or a synchronous switching operation wherein switching is performed at a designated timing of a radio frame can be selected arbitrarily.

Referring back to FIG. 1, each of the transmission spread processing circuits 1a and 1b may include a channel data demultiplexing section 6 for receiving a transmission baseband signal on which data of a plurality of channels are time division multiplexed from a channel coding processing circuit 2, demultiplexing the transmission baseband signal into data of the individual channels and converting the data of the individual channels into data corresponding to data rates for individual users, and outputs of the channel data demultiplexing section 6 may be inputted to both of the operating system spread processing section 5N and the standby system spread processing section 5E.

Where a plurality of channel coding circuits (2) are provided, they may be grouped corresponding to the dual transmission spread processing circuits 1a and 1b, and the channel data demultiplexing section 6 of each of the transmission spread processing circuits 1a and 1b may receive transmission baseband signals from the channel coding processing circuits 2a, 2b of the corresponding group.

The output selection section 8a may be controlled by that one of the control sections 9 which receives the failure detection signal from the failure detection section 10.

The addition synthesis section 7 of each of the transmission spread processing circuits 1a and 1b may include a first addition synthesis section 7a for adding a plurality of spread signals processed by the operating system spread processing section 5N, a second addition synthesis section 7b for adding a plurality of spread signals processed by the standby system spread processing section 5E, and a third addition synthesis section 7c for addition synthesizing synthetic spread signals of the first and second addition synthesis sections 7a and 7b.

Each of the failure detection sections 10 may detect a failure of the control section 9 as well so as to further promote the effects of dual system.

Figure 3:
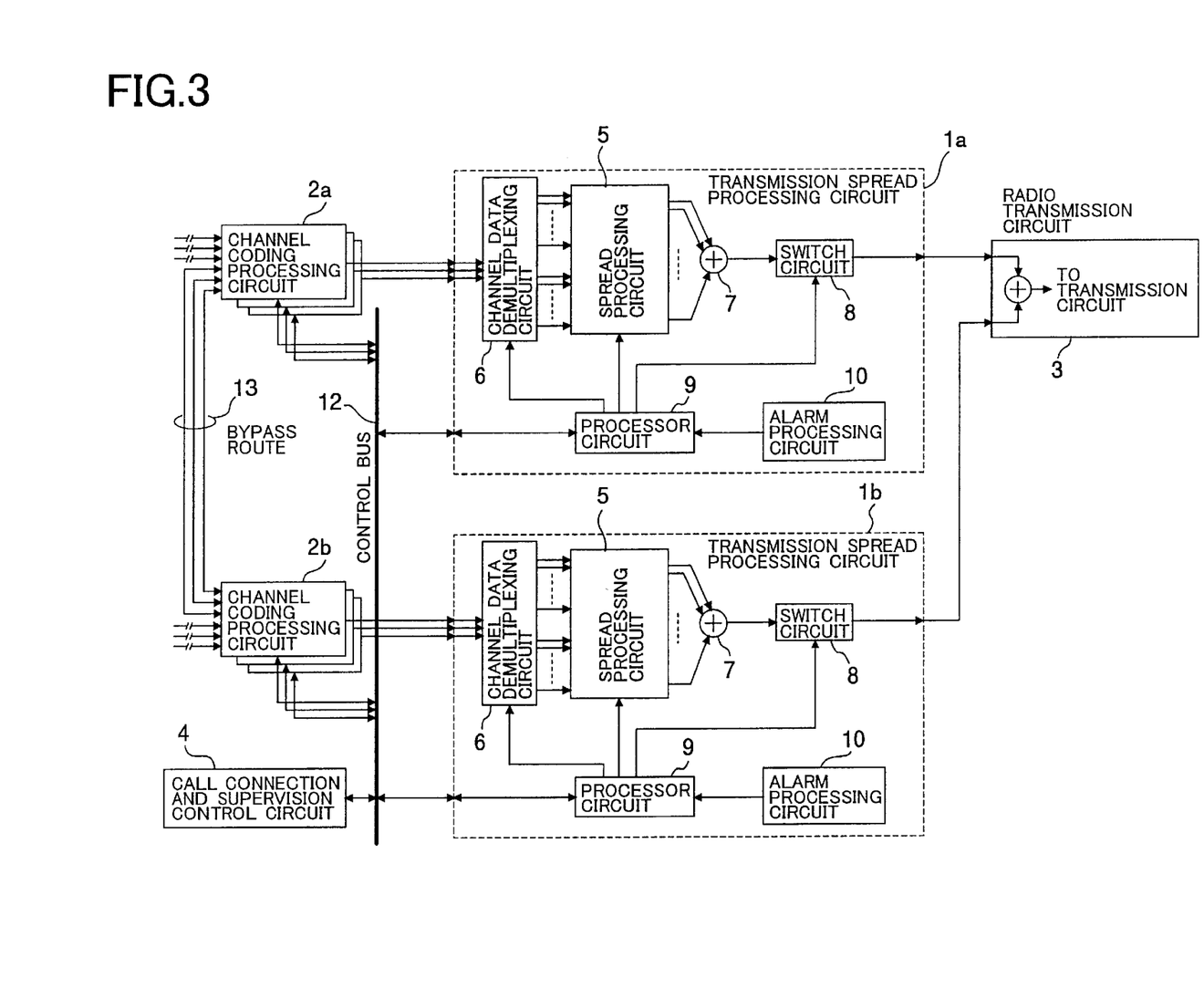
FIG. 3 is a block diagram of a dual transmission spread processing circuit system for a radio base station communications apparatus to which the present invention is applied.

Referring now to FIG. 3, there is shown a transmission section of a CDMA communication apparatus which adopts a dual transmission spread processing circuit system to which the present invention is applied.

A radio transmission circuit 3 is connected to the output sides of first and second transmission spread processing circuits 1a and 1b which form a dual configuration. Meanwhile, for example, six units of channel coding processing circuits are connected in two separate groups 2a and 2b each including 3 units to the input sides of the transmission spread processing circuits 1a and 1b, respectively. Bypass routes 13 connect the two groups of channel coding processing circuits 2a and 2b to each other.

Transmission baseband signals before spread from the channel coding processing circuits 2a and 2b are inputted to the transmission spread processing circuits 1a and 1b, respectively. In each of the transmission spread processing circuits 1a and 1b, the transmission baseband signals are spread modulated and addition synthesized by a spread processing circuit 5. Resulting synthesis spread signals from the spread processing circuits 5 of the transmission spread processing circuits 1a and 1b are transmitted to the radio transmission circuit 3. In the radio transmission circuit 3, the synthesis spread signals from the transmission spread processing circuits 1a and 1b are added by an inputting section first. Then, a resulting addition synthesis signal of the inputting section is inputted to a transmission circuit which performs quadrature amplitude modulation and radio frequency amplification.

The two groups of channel coding processing circuits 2a and 2b and the two transmission spread processing circuits 1a and 1b are connected to a call connection and supervision control circuit 4 by a control bus 12 so that coding processing information, spread processing information, signaling control information and so forth may be communicated.

When transmission base band signals on each of which data of a plurality of channels are time division multiplexed are inputted from the channel coding processing circuit 2a or 2b to each of the transmission spread processing circuits 1a and 1b, a channel data demultiplexing circuit 6 of each of the transmission spread processing circuits 1a and 1b demultiplexes the data of the individual channels from the transmission baseband signals and converts the data into user data suitable for data rates for individual users. The spread processing circuit 5 receives the plurality of user data of different data rates to perform transmission spread modulation and outputs spread signals for the individual users.

An addition synthesizer 7 outputs a synthesis spread signal obtained by addition of all of the spread signals for the individual users to the radio transmission circuit 3 through a switch circuit 8. The channel data demultiplexing circuit 6, spread processing circuit 5 and switch circuit 8 are all connected by software of a processor circuit 9. The processor circuit 9 is connected to the call connection and supervision control circuit 4 by the control bus 12 outside the transmission spread processing circuit 1a (1b) and principally communicates spread processing information and signaling control information. Further, the processor circuit 9 receives alarm information from an alarm processing circuit 10 and signals it to the call connection and supervision control circuit 4 over the control bus 12.

Transmission spread processing of the transmission section in its normal state is shared and performed by the first transmission spread processing circuit 1a and the second transmission spread processing circuit 1b. Here, if a failure occurs with the first transmission spread processing circuit 1a, then the failure is first detected by the alarm processing circuit 10 in the first transmission spread processing circuit 1a similarly as in the conventional system described hereinabove.

The failure detection information is sent to the processor circuit 9 of the transmission spread processing circuit 1a itself and is further transmitted over the control bus 12 outside the transmission spread processing circuit 1a to the call connection and supervision control circuit 4 so that switching control is performed. The switching here is to cause the transmission spread processing, which has been processed parallelly by the two systems of the first transmission spread processing circuit 1a and the second transmission spread processing circuit 1b, to be performed by the one system only of the second transmission spread processing circuit 1b and to make it possible for the second transmission spread processing circuit 1b to perform the processing for the two systems.

As operation of each of the transmission spread processing circuits 1a and 1b in a normal state, it is preferable from the point of view of minimization of the time of the switching process that such a condition that each of the transmission spread processing circuits 1a and 1b can perform, in addition to the transmission spread processing assigned to the transmission spread processing circuit itself, the transmission spread processing being performed by the other transmission spread processing circuit is prepared. That such a condition that each of the transmission spread processing circuits 1a and 1b can perform the transmission spread processing is prepared here signifies that, although it is set that a portion of the spread processing circuit performs or can perform the transmission spread processing for the other spread processing circuit, a spread signal relating to this portion is not outputted.

The switching processing performed by the call connection and supervision control circuit 4 in this condition is to control the switch circuit 8 in the failed transmission spread processing circuit 1a so that the transmission output of the transmission spread processing circuit 1a may be stopped and to simultaneously make it possible to output spread signals of the spread processing circuit 5 of the second transmission spread processing circuit 1b in order to make effective the spread processing set to the spread processing circuit 5 of the second transmission spread processing circuit 1b, that is, the setting corresponding to the spread processing which has been performed by the other failed side spread processing circuit.

Where, for example, six units of channel coding processing circuits are involved as shown in FIG. 3, the six units of channel coding processing circuits are divided into two groups 2a and 2b each including 3 units as described above so as to correspond to the transmission spread processing circuits 1a and 1b, respectively. Consequently, the number of input signal lines inputted to the channel data demultiplexing circuit 6 of each of the transmission spread processing circuits 1a and 1b is 3 and consequently is one half that of the conventional scheme of FIG. 9. Consequently, the CDMA communication apparatus can be produced in a comparatively small size and at a comparatively low cost.

However, in order to realize this, such processing and control as described below are required.

While each of the channel coding processing circuits 2a and 2b of the first and second groups multiplexes a plurality of input signals, it performs such functions as described below as well under the control from the control bus 12.

(1) A function of outputting an output signal obtained by multiplexing processing to an output terminal to the other side channel coding processing circuit, that is, also to a bypass route 13.
(2) A function of multiplexing a signal inputted from a bypass route 13 further with an output signal and outputting a multiplexed signal.

This is intended to disconnect, when a failure occurs with one of the transmission spread processing circuits, the failed transmission spread processing circuit by such control as described below to compensate with the other transmission spread processing circuit.

Now, if it is assumed that a failure occurs with the second transmission spread processing circuit 1b, then the alarm processing circuit 10 in the second transmission spread processing circuit 1b detects the failure and notifies the processor circuit 9 of the failure. The processor circuit 9 switches off the switch circuit 8 controlled by the processor circuit 9 itself to stop the outputting to the radio transmission circuit 3 and notifies the call connection and supervision control circuit 4 outside the transmission spread processing circuit 1b. The call connection and supervision control circuit 4 controls the first channel coding processing circuits 2a to perform coding processing for the input signals thereto and further multiplex signals inputted form the bypass routes 13 with the coded signals and then output resulting signals. Simultaneously, the call connection and supervision control circuit 4 controls the transmission spread processing circuit 1b with which the failure has occurred to perform coding processing for input signals thereto and output the coded signals to the bypass routes 13.

Consequently, output signals of the first channel coding processing circuits 2a are inputted to the channel data demultiplexing circuit 6 of the first transmission spread processing circuit 1*a* as information of the quantity same as that where six input signal lines are used in FIG. 9 in order to secure the twice transmission rate.

Simultaneously with such control, the information is transmitted also to the processor circuit 9 of the first transmission spread processing circuit 1*a* from the call connection and supervision control circuit 4. Then, the processor circuit 9 controls the channel data demultiplexing circuit 6, the spread processing circuit 5 and so forth with the information. Consequently, automatic switching is performed so that the spread processing circuit 5 by itself of the first transmission spread processing circuit 1*a* may perform all spread processing including the spread processing of the transmission spread processing circuit 1*b* which has been performed till then.

In the system shown in FIG. 3, however, such switch processing and control to the standby system as described above must be performed by software of the processor circuits 9, and the switching to the standby system cannot be completed momentarily but time is required. Therefore, the system shown in FIG. 3 has a drawback in that a long response time after occurrence of a fault till restoration is required.

Figure 4:
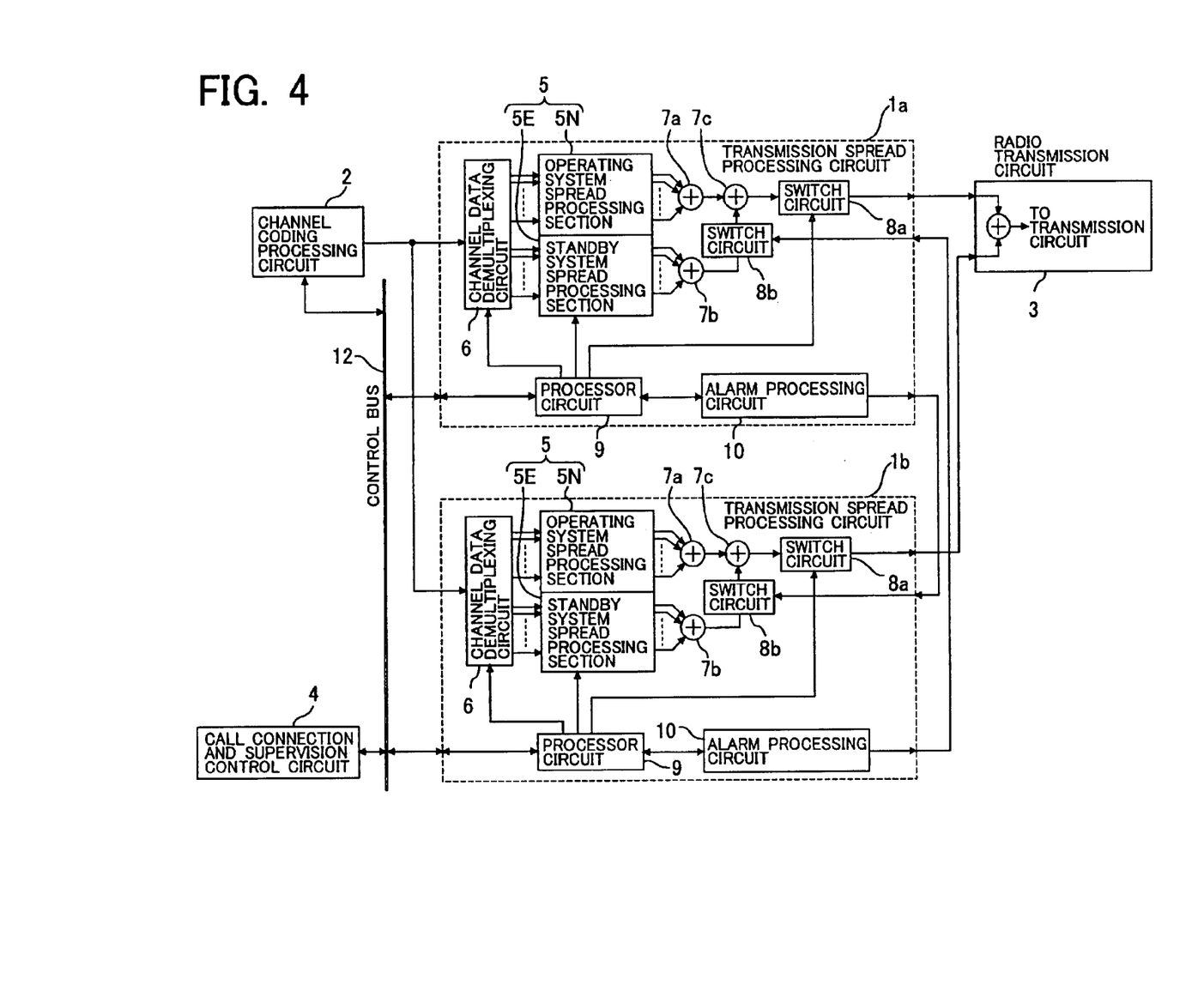
FIG. 4 is a block diagram of another dual transmission spread processing circuit system for a radio base station communications apparatus to which the present invention is applied.

Therefore, in another preferred embodiment of the present invention, in order to make it possible to momentarily perform switching after occurrence of a failure till recovery using hardware means while assuring miniaturization and reduction in cost of the apparatus, such a configuration as shown in FIG. 4 is adopted. In particular, referring to FIG. 4, there is shown a transmission section of a CDMA communication apparatus which adopts another dual transmission spread processing circuit system to which the present invention is applied. The dual transmission spread processing circuit system includes first and second transmission spread processing circuits 1*a* and 1*b* similar to those of the dual transmission spread processing circuit system of FIG. 3. The transmission spread processing circuits 1*a* and 1*b* of the dual transmission spread processing circuit system of FIG. 4 are different in configuration in that the internal configuration of the spread processing circuit 5 is divided into two regions for an operating system and a standby system in advance, that is, into an operating system spread processing section 5N and a standby system spread processing section 5E. Also the addition synthesis section for performing addition synthesis of spread processing outputs of the operating system spread processing section 5N and the standby system spread processing section 5E is divided into a first addition synthesizer 7*a* which performs addition synthesis of spread signal outputs of the operating system and a second addition synthesizer 7*b* which performs addition synthesis of spread signal outputs of the standby system and further includes a third addition synthesizer 7*c* for adding a synthesis spread signal of the operating system and a synthesis spread signal of the standby system. Also the switch circuit includes, in addition to a first switch circuit 8*a* which is an output selection section for switching on/off an output to the radio transmission circuit 3, a second switch circuit 8*b* which is an addition selection section for controlling whether or not the synthesis spread signal of the standby system should be addition synthesized with the synthesis spread signal of the operating system by the third addition synthesizer 7*c*.

Further, failure detection information of each of the transmission spread processing circuits 1*a* and 1*b* is detected by the alarm processing circuit 10 of the transmission spread processing circuit 1*a* or 1*b* itself which serves also as a failure detection section. The failure detection information is outputted to the processor circuit 9 which serves as a control section of the transmission spread processing circuit 1*a* or 1*b* itself similarly as in the prior art while it is delivered directly to the other transmission spread processing circuit and used as a control signal for the second switch circuit 8*b* of the other side.

Subsequently, operation of the system of FIG. 4 is described.

In a normal state, both of the two dual transmission spread processing circuits 1*a* and 1*b* are used. In this instance, in the two transmission spread processing circuits 1*a* and 1*b*, the operating system spread processing sections 5N of the spread processing circuits 5 share and process the spread processing required for the system and output resulting signals through the first switch circuits 8*a* without causing the third addition synthesizers 7*c* of them to function. Then, the radio transmission circuit 3 synthesizes outputs of both of the transmission spread processing circuits 1*a* and 1*b*, that is, outputs of the operating system spread processing sections 5N of the two spread processing circuits 5.

Further, to the standby system spread processing sections 5E of the spread processing circuits 5, the same spread processing as the spreading of the operating systems of the spread processing circuits 5 of the other sides is set. However, since outputs of the spread signals of the standby system spread processing sections 5E of the spread processing circuits 5 are stopped by the second switch circuits 8*b*, they are not added to spread signal outputs of the operating systems by the third addition synthesizers 7*c* and hence are not outputted from the transmission spread processing circuit 1*a* or 1*b*.

Here, since the standby system spread processing sections 5E for the standby systems of the transmission spread processing circuits of the other sides are allocated in advance to the spread processing circuits 5 of the individual transmission spread processing circuits 1*a* and 1*b*, switching for causing only one transmission spread processing circuit to perform all of the spread processing for the operating systems can be performed at any time.

Now, if it is assumed that a failure occurs with the transmission spread processing circuit 1*a*, then the failure is first detected by the alarm processing circuit 10 in the transmission spread processing circuit 1*a*. Then, the failure detection information is sent to the processor circuit 9 of the transmission spread processing circuit 1*a*, and the processor circuit 9 controls the first switch circuit 8*a* of the failed side to interrupt outputting from the first switch circuit 8*a*. The failure detection information is directly delivered also to the transmission spread processing circuit 1*b* side which is normal and is inputted as a control signal for the second switch circuit 8*b* which switches a spread signal output of the standby system on/off in the transmission spread processing circuit 1*b*. As a result, in the transmission spread processing circuit 1*b* on one side which is normal, spread signals of the operating system from the operating system spread processing section 5N and spread signals of the standby system from the standby system spread processing section 5E are added by the third addition synthesizer 7*c*. Then, the synthesis spread signal obtained by the addition is outputted to the radio transmission circuit 3 through the first switch circuit 8*a*.

In this manner, in the present system, since signaling of spread signals of the standby system of the normal side is controlled directly with failure detection information of the failure occurrence side system and spread signals of the standby system from within spread signals which are spread processed by the normal side are addition synthesized with spread signals of the operating system on the normal side, switching control to the standby system can be performed at a high speed.

Therefore, switching processing of the processor circuit 9 with software need not necessarily be required, and consequently, switching only by hardware can be performed. From this, an effect that the switching time to the standby system can be reduced is achieved. Further, since the standby system spread processing section 5E can normally be kept in a power-down state, an energy saving effect can be obtained.

Figure 5:
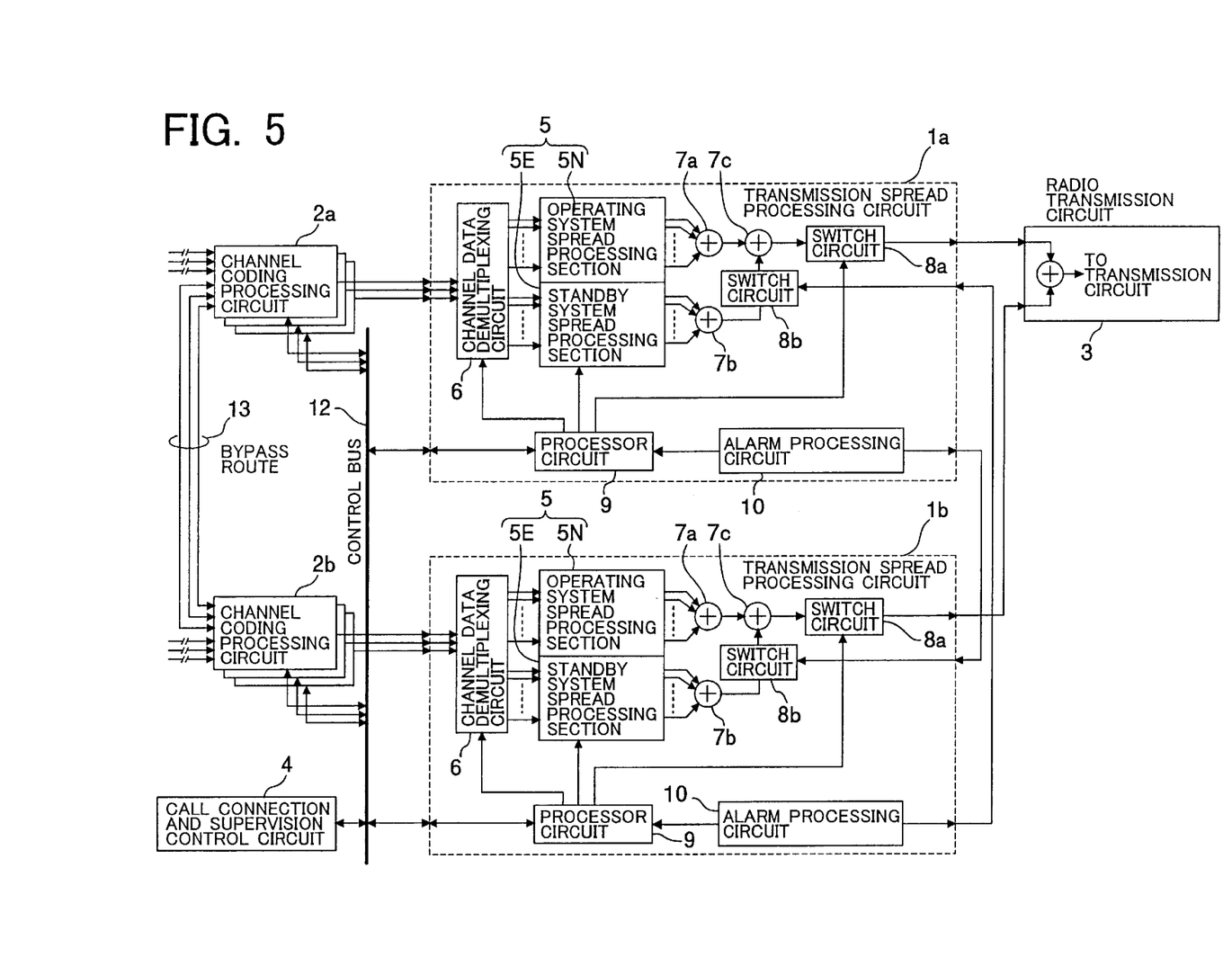
FIG. 5 is a block diagram showing a modification to the dual transmission spread processing circuit system for a radio base station communications apparatus shown in FIG. 4 wherein it is connected to a plurality of channel coding processing circuits.

FIG. 5 shows a modification to the transmission section of the CDMA communication apparatus described hereinabove with reference to FIG. 4 in that it is connected to a plurality of channel coding processing circuits. Also in this instance, six units of channel coding processing circuits are divided into two groups 2a and 2b each including three units and corresponding to the first and second transmission spread processing circuits 1a and 1b, respectively. Consequently, the number of input signal lines inputted to the channel data demultiplexing circuit 6 of each of the transmission spread processing circuits 1a and 1b is 3. Besides, the internal configuration of each of the transmission spread processing circuits 1a and 1b is controlled by switching only by hardware similarly as in the case of FIG. 4.

Figure 6:
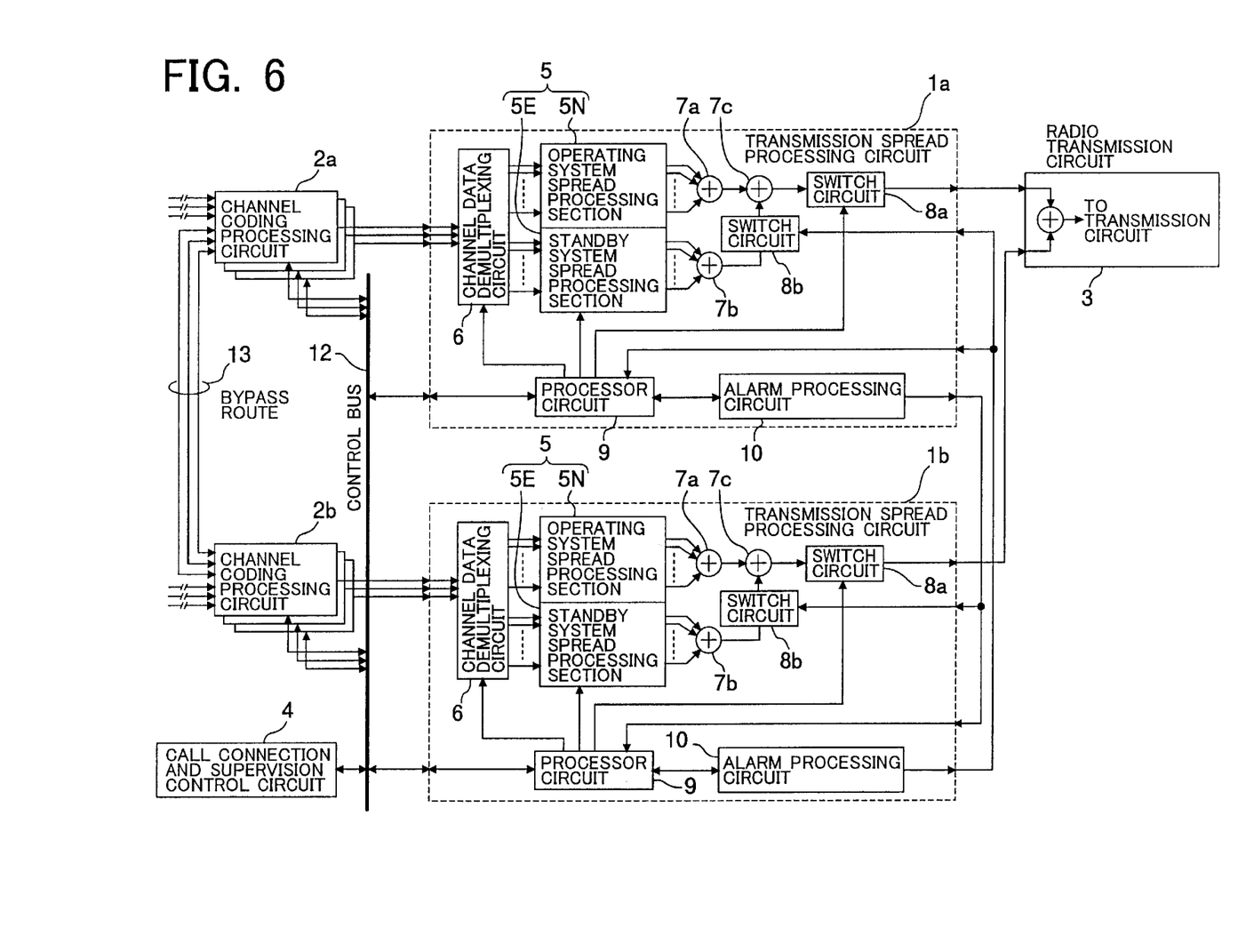
FIG. 6 is a block diagram of a modification to the dual transmission spread processing circuit system for a radio base station communications apparatus of FIG. 5.

FIG. 6 shows a modification to the transmission section of the CDMA communication apparatus described hereinabove with reference to FIG. 5. In the dual transmission spread processing circuit system in the CDMA communication apparatus, the alarm processing circuit 10 in each of the transmission spread processing circuits 1a and 1b supervises the processor circuit 9 for an abnormal state so that it can detect also a failure of the processor circuit 9. If an abnormal state is detected, then the transmission spread processing circuit 1a or 1b sends failure information detected by itself also to the processor circuit 9 of the other transmission spread processing circuit.

With the configuration described, since the channel coding processing circuit 2a or 2b can be controlled directly over the control bus 12 by the processor circuit 9 of the transmission spread processing circuit of the normal side which has received failure information from the alarm processing circuit 10 of the transmission spread processing circuit of the failed side, or in other words, since switching from the operating system to the standby system can be performed without the intervention of the call connection and supervision control circuit 4, further increase in speed of switching can be achieved. Further, such switching can be performed also when the call connection and supervision control circuit 4 fails.

Figure 7:
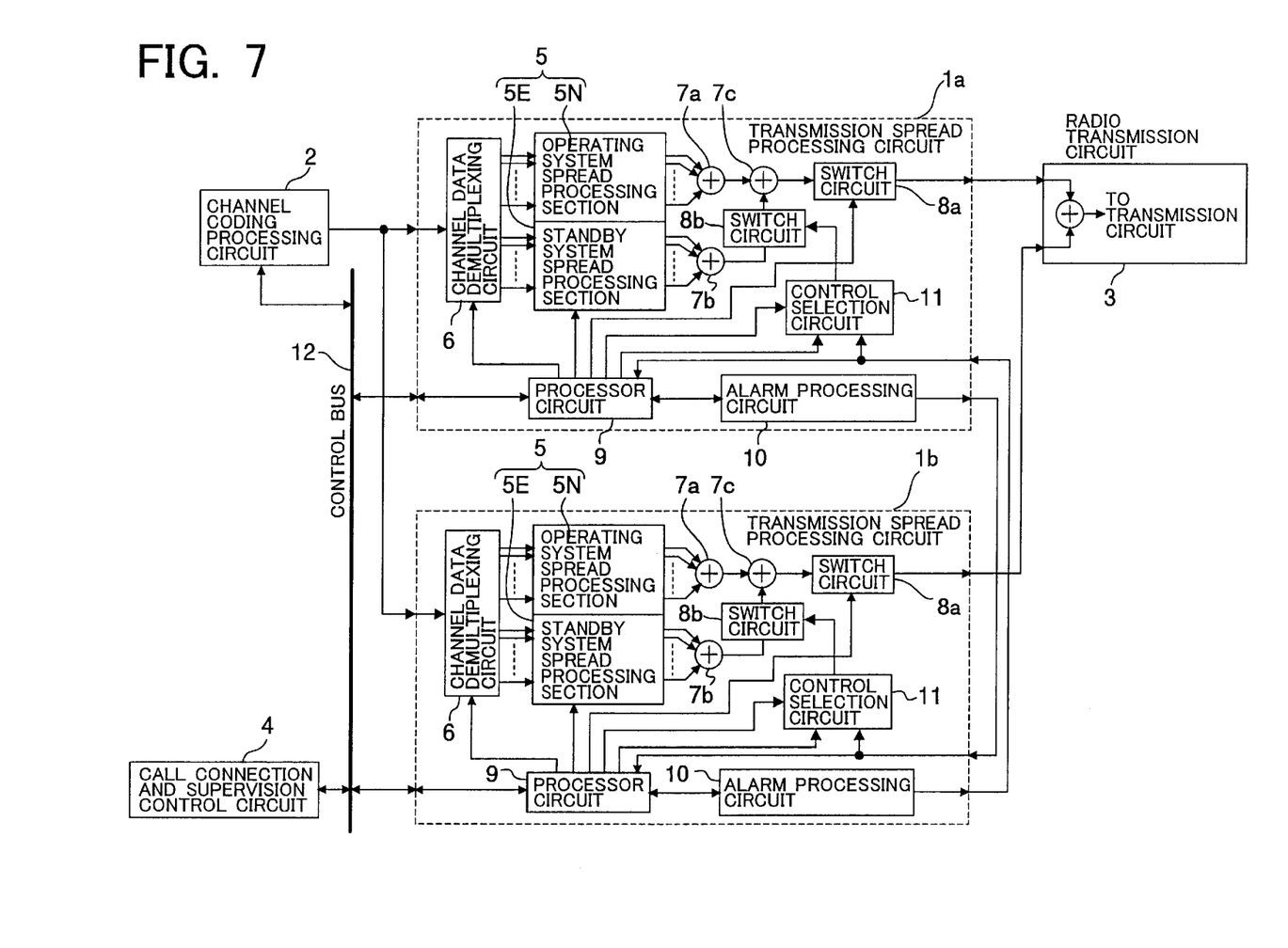
FIG. 7 is a block diagram showing a further dual transmission spread processing circuit system for a radio base station communications apparatus to which the present invention is applied.

FIG. 7 shows a transmission section of a CDMA communication apparatus which adopts a further dual transmission spread processing circuit system to which the present invention is applied. The CDMA communication apparatus of FIG. 7 is a modification to but is different from the CDMA communication apparatus described hereinabove with reference to FIG. 4 in that each of the transmission spread processing circuits 1a and 1b additionally includes a control selection circuit 11. Consequently, failure information inputted from the alarm processing circuit 10 of the other side transmission spread processing circuit or an on/off control signal from the processor circuit 9 of the transmission spread processing circuit itself can be selected as a control signal for controlling the second switch circuit 8b by the control selection circuit 11 in each of the transmission spread processing circuits 1a and 1b. Also the control selection circuit 11 can be controlled by the processor circuit 9 of the transmission spread processing circuit itself.

In FIG. 7, where failure information from the other side transmission spread processing circuit inputted from the outside of the transmission spread processing circuit is selected by the control selection circuit 11, operation is quite similar to the operation of the CDMA communication apparatus of FIG. 4. Consequently, switching to the standby system can be performed momentarily by hardware.

The failure information from the other side transmission spread processing circuit can be fetched also by the processor circuit 9 and transmitted without the intervention of the call connection and supervision control circuit 4 and the control bus 12 on the outside.

On the other hand, when an on/off control signal from the processor circuit 9 of the transmission spread processing circuit itself is selected, switching is performed not momentarily when a failure is detected, but since the switching timing depends upon an output timing of the on/off control signal from the processor circuit 9, the switching timing can be controlled.

In this manner, in the present CDMA communication apparatus, one of two operations of a momentary switching operation almost simultaneous with occurrence of a failure and a synchronous switching operation in which switching is performed at a preset timing synchronized with a signal can be selected similarly as in the CDMA communication apparatus of FIG. 4. From this, an effect can be achieved that, by arbitrarily selecting a momentary switching operation which is a method which makes the switching time as short as possible in accordance with a situation or a synchronous switching operation which is a method by which switching is performed at a designated timing, a systematic influence in switching can be suppressed to the minimum.

In particular, the following two choices are possible in application.

(I) When the alarm processing circuit 10 detects a fault such as a failure of the apparatus:

At a point of time when the alarm processing circuit 10 detects a fault, since, in most cases, the output signal of the apparatus is abnormal due to a failure, in order to restore it immediately, switching to the standby system is performed momentarily.

(II) When it is desired to remove a particular system from the operating system in order to perform maintenance or the like:

In this instance, the continuity of the output signal before and after the switching must be secured so that the continuity of the output signal may not be damaged by the switching. Since the time after a switching operation till completion of the switching has a sufficient margin when compared with that in (I), control relating to software such as to utilize a boundary point between radio frames of the output signal can be performed to effect switching.

While preferred embodiments of the present invention have been described using specific terms, such description is for illustrative purposes only, and it is to be understood that changes and variations may be made without departing from the spirit or scope of the following claims.

What is claimed is:

1. A dual transmission spread processing circuit system for a CDMA communication apparatus, comprising:
   dual transmission spread processing circuits each including a spread processing section for spread modulating transmission data of a plurality of channels, an addition synthesis section for addition synthesizing a plurality of spread signals processed by said spread processing section, an output selection section for selecting whether or not a synthetic spread signal of said addition synthetic section should be outputted, a failure detection section for detecting a failure, and a control section;

said spread processing section of each of said transmission spread processing circuits including two sections of an operating system spread processing section and a standby system spread processing section;

said addition synthesis section addition synthesizing spread signals processed by said operating and standby system spread processing sections separately from each other;

each of said transmission spread processing circuits including an addition selection section for selecting whether or not the operating system spread signal and the standby system spread signal should be addition synthesized;

said addition selection section being controlled with a failure detection signal from said failure detection section of the other one of said dual transmission spread processing circuits.

2. A dual transmission spread processing circuit system as claimed in claim 1, wherein each of said transmission spread processing circuits includes a control selection section for selecting whether said addition selection section should be controlled immediately or through said control section when a failure detection signal is received from said failure detection section of the other one of said transmission spread processing circuits.

3. A dual transmission spread processing circuit system as claimed in claim 2, wherein, when said addition selection section should be controlled through said control section, said addition selection section is changed over to the addition side at a designated timing in a radio frame.

4. A dual transmission spread processing circuit system as claimed in claim 1, wherein said output selection section is controlled by that one of the control sections which receives the failure detection signal from said failure detection section.

5. A dual transmission spread processing circuit system as claimed in claim 1, wherein said addition synthesis section of each of said transmission spread processing circuits includes a first addition synthesis section for adding a plurality of spread signals processed by said operating system spread processing section, a second addition synthesis section for adding a plurality of spread signals processed by said standby system spread processing section, and a third addition synthesis section for addition synthesizing synthetic spread signals of said first and second addition synthesis sections.

6. A dual transmission spread processing circuit system as claimed in claim 1, wherein each of the failure detection sections detects a failure of said control section as well.

7. A dual transmission spread processing circuit system as claimed in claim 1, wherein each of said transmission spread processing circuits includes a channel data demultiplexing section for receiving a transmission baseband signal on which data of a plurality of channels are time division multiplexed from a channel coding processing circuit, demultiplexing the transmission baseband signal into data of the individual channels and converting the data of the individual channels into data corresponding to data rates for individual users, and outputs of said channel data demultiplexing section are inputted to both of said operating system spread processing section and said standby system spread processing section.

8. A dual transmission spread processing circuit system as claimed in claim 7, wherein a plurality of channel coding circuits are provided and grouped corresponding to the dual transmission spread processing circuits, and said channel data demultiplexing section of each of said transmission spread processing circuits receives transmission baseband signals from the channel coding processing circuits of the corresponding group.

9. A dual transmission spread processing circuit system as claimed in claim 8, wherein said control section receives the failure detection signal from said fault detection section of the other one of the dual transmission spread processing circuits and controls said channel coding processing circuits over a control bus.

10. A dual transmission spread processing circuit system for a CDMA communication apparatus, comprising:

dual transmission spread processing circuits each including a channel data demultiplexing section for receiving a transmission baseband signal on which data of a plurality of channels are time division multiplexed from a channel coding processing circuit, demultiplexing the transmission baseband signal into data of the individual channels and converting the data of the individual channels into data corresponding to data rates for individual users, a spread processing section for spread modulating the transmission data of the plurality of channels processed by said channel data demultiplexing section, an addition synthesis section for addition synthesizing a plurality of spread signals processed by said spread processing section, an output selection section for selecting whether or not a synthetic spread signal of said addition synthetic section should be outputted, a failure detection section for detecting a failure, and a control section;

a plurality of channel coding processing circuits being provided and grouped corresponding to the dual transmission spread processing circuits;

said channel data demultiplexing section of each of said transmission spread processing circuits receiving transmission baseband signals from said channel coding processing circuits of the corresponding group;

said channel coding processing circuits of the two groups being connected to each other by bypass routes;

said channel coding processing circuits of each of the groups being connected to said control section and a call connection and supervision section over a control bus; and said call connection and supervision section controlling, when said failure detection section of one of said transmission spread processing circuits with which a failure has occurred detects the failure and issues a notification of the failure to said call connection and supervision section over said control bus, said channel coding processing circuits of the two groups so that processing by the plurality of channel coding processing circuits of the failed side group is transferred to the plurality of channel coding processing circuits of the normal side group.

* * * * *